US010144816B2

(12) United States Patent
Ikeda et al.

(10) Patent No.: US 10,144,816 B2
(45) Date of Patent: Dec. 4, 2018

(54) SPHERICAL ALUMINA POWDER AND RESIN COMPOSITION USING SAME

(71) Applicant: DENKA COMPANY LIMITED, Tokyo (JP)

(72) Inventors: Kazuyoshi Ikeda, Fukuoka (JP); Motoharu Fukazawa, Tokyo (JP); Takafumi Komaki, Fukuoka (JP)

(73) Assignee: DENKA COMPANY LIMITED, Tokyo (JP)

( * ) Notice: Subject to any disclaimer, the term of this patent is extended or adjusted under 35 U.S.C. 154(b) by 0 days.

(21) Appl. No.: 15/328,785

(22) PCT Filed: Jul. 28, 2015

(86) PCT No.: PCT/JP2015/071371
§ 371 (c)(1),
(2) Date: Jan. 24, 2017

(87) PCT Pub. No.: WO2016/017637
PCT Pub. Date: Feb. 4, 2016

(65) Prior Publication Data
US 2017/0210886 A1   Jul. 27, 2017

(30) Foreign Application Priority Data

Jul. 28, 2014  (JP) ................... 2014-152865

(51) Int. Cl.
| | |
|---|---|
| *B32B 5/16* | (2006.01) |
| *B05D 7/00* | (2006.01) |
| *C08K 9/06* | (2006.01) |
| *C01F 7/02* | (2006.01) |
| *C08L 101/00* | (2006.01) |
| *C08K 3/22* | (2006.01) |
| *C08K 7/18* | (2006.01) |
| *C09C 1/40* | (2006.01) |
| *C09K 5/14* | (2006.01) |

(52) U.S. Cl.
CPC ............ *C08K 9/06* (2013.01); *C01F 7/02* (2013.01); *C01F 7/021* (2013.01); *C08K 3/22* (2013.01); *C08K 7/18* (2013.01); *C08L 101/00* (2013.01); *C09C 1/40* (2013.01); *C09C 1/407* (2013.01); *C09K 5/14* (2013.01); *C01P 2004/32* (2013.01); *C01P 2004/61* (2013.01); *C01P 2004/62* (2013.01); *C08K 2003/2227* (2013.01); *C08K 2201/001* (2013.01); *C08K 2201/003* (2013.01); *C08K 2201/005* (2013.01); *C08K 2201/016* (2013.01)

(58) Field of Classification Search
CPC ........................................................ C09C 3/12
USPC ................................................. 428/403–406
See application file for complete search history.

(56) References Cited

U.S. PATENT DOCUMENTS

| | | | |
|---|---|---|---|
| 6,169,142 B1 | 1/2001 | Nakano et al. | |
| 6,573,018 B2 * | 6/2003 | Ishibashi | C09C 3/12 430/108.2 |
| 2014/0302325 A1 * | 10/2014 | Shimada | C09C 3/12 428/405 |

FOREIGN PATENT DOCUMENTS

| | | |
|---|---|---|
| JP | H09296114 A | 11/1997 |
| JP | H11209618 A | 8/1999 |
| JP | 2000001616 A | 1/2000 |
| JP | 2001226117 A | 8/2001 |
| JP | 2005068258 A | 3/2005 |
| JP | 2008143725 A | 6/2008 |
| JP | 2012020900 A | 2/2012 |
| JP | 2014122364 A | 7/2014 |

OTHER PUBLICATIONS

English language abstract for JP H09296114 A (1997).
English language abstract for JP H11209618 A (1999).
English language abstract for JP 2000001616 A (2000).
English language abstract for JP 2001226117 A (2001).
English language abstract for JP 2005068258 A (2005).
English language abstract for JP 2008143725 A (2008).
English language abstract for JP 2012020900 A (2012).
English language abstract for JP 2014122364 A (2014).
International Search Report from PCT/JP2015/071371 dated Sep. 8, 2015.
Chemical Industry Press Beijing. (2009). Analytical Chemistry Data Quick Manual. pp. 224-225.

* cited by examiner

*Primary Examiner* — Hoa (Holly) Le
(74) *Attorney, Agent, or Firm* — Caesar Rivise, PC

(57) ABSTRACT

Provided is a spherical alumina powder which, when incorporated into resins in a high concentration, enables a resin composition to have low viscosity and which has reduced viscosity increase in the resin composition over time after surface treatment of the spherical alumina powder. The spherical alumina powder has an alkyl group(s) derived from a silane compound(s) on its surface, and is characterized in that an intensity ratio $\{I\,(CH_3)/I\,(CH_2)\}$ of a peak $(2960\pm 5\,cm^{-1})$ associated with asymmetric vibration of $CH_3$ to a peak $(2925\pm 5\,cm^{-1})$ associated with asymmetric vibration of $CH_2$ in the alkyl group(s) of the silane compound(s) in the same spectral data obtained by infrared spectroscopic analysis measurement is 0.2 or more and less than 2.0.

10 Claims, No Drawings

SPHERICAL ALUMINA POWDER AND RESIN COMPOSITION USING SAME

CROSS-REFERENCE TO RELATED APPLICATIONS

This application is the U.S. National Phase Application of PCT/JP2015/071371, filed Jul. 28, 2015, which claims priority from JP 2014-152865, filed Jul. 28, 2014, the contents of which applications are incorporated herein by reference in their entireties for all purposes.

TECHNICAL FIELD

The present invention relates to a spherical alumina powder and a resin composition using the same.

BACKGROUND ART

In recent years, as heat-generating electronic components such as ICs and MPUs have been smaller and thinner and become higher functional, an amount of heat generated by electronic devices equipped with electronic components has increased, and the development of an efficient heat dissipation method has been still expected. The heat dissipation of an electronic device has been done by attaching a heat sink to a substrate equipped with heat-generating electronic components, or by directly attaching a substrate to a metal chassis of the electronic device when a space for installing the heat sink cannot be ensured. In this case, the heat sink has been attached via a heat radiating member such as a sheet formed by filling inorganic powder having good electric insulation properties and thermal conductivity, for example inorganic powder such as boron nitride powder, aluminum nitride powder and alumina powder, into a silicone rubber, or a flexible sheet having an Asker C hardness of 25 or less (Patent Document 1).

The quality of heat dissipation properties in a resin composition after molding is greatly influenced by thermal conductivity of the resin composition after the molding and adhesiveness to the adherend (shape followability), and also affected by the presence or absence of voids (air layers) included in the resin composition. The thermal conductivity is maintained by incorporating the inorganic powder in a higher concentration, but when the inorganic powder are highly filled into a resin or the like, the fluidity of the resin composition before molding is greatly deteriorated, so that the moldability is impaired and adhesion is remarkably deteriorated. On the other hand, as the viscosity of the resin composition before molding increases, the voids included therein are difficult to be eliminated, so that the thermal conductivity also decreases. Based on this, to maintain the filling rate of the inorganic powder to a certain extent so that both of the fluidity and the higher thermal conductivity of the resin composition before molding are achieved, while not to significantly impair the moldability and adhesiveness, the use of spherical alumina powder and alkoxysilane compounds has been proposed (Patent Document 2).

Further, the higher filling of the inorganic powder not only impairs the fluidity of the resin composition before the molding, but also significantly reduces heat resistance reliability of mechanical properties of the molded resin composition, such as an increase in permanent compression set and a decrease in tensile strength of the resin composition after the molding. As a method for improving the heat resistance reliability of the mechanical properties, it has been proposed to treat the surfaces of the inorganic powder with an alkoxysilane compound(s) having a long chain alkyl group(s) (Patent Document 3).

In the surface treatment of spherical alumina powder using a trialkoxysilane compound having three functional groups, not all of the three functional groups of the trialkoxysilane compound react with the surfaces of the inorganic powder, leaving some unreacted functional groups. The remaining unreacted functional groups would allow disordered progress of polymerization of the trialkoxysilane compounds over time due to effects of temperature and humidity. There has been a problem that if the polymerization with the reaction between the trialkoxysilanes could not be controlled, viscosity of the resin composition before the molding process was increased to impair fluidity as compared with the untreated inorganic powder due to effects of the polymerized silane compounds and the spherical alumina.

PRIOR ART DOCUMENT

Patent Documents

Patent Document 1: Japanese Patent Application Public Disclosure (KOKAI) No. H9-296114
Patent Document 2: Japanese Patent Application Public Disclosure (KOKAI) No. 2000-1616
Patent Document 3: Japanese Patent Application Public Disclosure (KOKAI) No. H11-209618

SUMMARY OF INVENTION

Problem to be Solved by the Invention

The present invention has been made in view of these, and provides a spherical alumina powder which, when highly filled in a resin, enables a resin composition to have low viscosity and which has reduced viscosity increase in the resin composition with the lapse of time of the spherical alumina powder after being subjected to surface treatment, due to increased affinity between the spherical alumina powder and the resin.

Means for Solving the Problem

In order to solve the above problem, the present invention employs the following approaches:
(1) A spherical alumina powder having an alkyl group(s) derived from a silane compound(s) on its surface, wherein a peak intensity ratio $\{I(CH_3)/I(CH_2)\}$ of a peak (2960±5 cm$^{-1}$) associated with asymmetric vibration of CH3 to a peak (2925±5 cm$^{-1}$) associated with asymmetric vibration of CH2 in the alkyl group(s) of the silane compound(s) in the same spectral data obtained by infrared spectroscopic analysis measurement is 0.2 or more and less than 2.0.
(2) The spherical alumina powder according to the above feature (1), wherein an average particle size is 0.1 to 100 μm and average sphericity is 0.85 or more.
(3) The spherical alumina powder according to the feature (1) or (2), wherein the alkyl groups are derived from both of the silane compounds of the chemical formulae (1) and (2):

$$CH_3(CH_2)_nSiX_3 \qquad \text{Chemical Formula (1)}$$

with X=a methoxy group or an ethoxy group, and n=an integer from 5 to 15;

$$(CH_3)_3SiX \qquad \text{Chemical Formula (2)}$$

with X=a methoxy group or an ethoxy group.

(4) The spherical alumina powder according to any one of the above features (1) to (3), wherein the total carbon content is from 0.05 to 0.9% by mass.

(5) A resin composition comprising the spherical alumina powder according to any one of features (1) to (4).

Effects of the Invention

According to the present invention, it is possible to provide a spherical alumina powder which, when highly filled in a resin, enables a resin composition to have low viscosity and which has reduced viscosity increase in the resin composition with the lapse of time of the spherical alumina powder after being subjected to surface treatment.

MODES FOR CARRYING OUT THE INVENTION

Hereinafter, the present invention will be described in more detail.

In the present invention, the spherical alumina powder refers to an alumina powder having average sphericity of 0.8 or more, and an alumina powder having average sphericity of 0.85 or more may be preferably used. The alumina powder having average sphericity of 0.85 or more can be easily produced by a flame spraying technique using an alumina powder as a starting material (for example, "Regarding thermal spraying repairing technology for steel kiln furnace", SEITESTU KENKYU (Iron Manufacturing Research), 1982, No. 310). In this method, to produce an alumina powder having average sphericity of 0.85 or more, flame spraying conditions such as an elevated temperature range (about 2000° C. or higher) of flames formed by LPG and the like may be formed as large as possible, while charging dispersed alumina powder. When the average sphericity is significantly smaller than 0.85, a risk of incorporation of metal foreign matters due to mold wear for the reason caused by its shape is increased, as well as viscosity of the composition before the molding is increased, so that the content of the alumina powder in the resin composition cannot be increased.

On the other hand, when the spherical alumina powder is highly charged, the combination of the particles having different average particle sizes is blended based on the closest packing theory. In this case, the average particle size of larger than 100 μm tends to cause a problem of sedimentation or the problem due to the mold wear as described above. Further, when the average particle size is smaller than 0.1 μm, agglomeration tends to occur, and an increase in viscosity associated with an increase in the specific surface area will exceed an effect of the surface treatment, thereby markedly deteriorating moldability. Therefore, the average particle size range suitable for particle-size blending of the spherical alumina powder is preferably 0.1 to 100 μm, more preferably 0.3 to 70 μm, and still more preferably 0.6 to 50 μm. Examples of the spherical alumina powder that can be suitably used in the present invention may include products available from Denka Company Limited (ASFP-20, DAW-05, DAW-10, DAW-45, DAS-45, DAW-70, etc.).

(1) Average Sphericity

The average sphericity was measured using a flow type particle image analyzer under the trade name of "FPIA-3000" sold by Sysmex Corporation, as follows. A projected area (A) and a peripheral length (PM) of a particle are measured from a particle image. Assuming that an area of a perfect circle corresponding to the perimeter (PM) is (B), the sphericity of the particle can be indicated as A/B. Then, assuming a perfect circle having the same perimeter as the perimeter (PM) of the sample particle, as $PM=2\pi r$ and $B=\pi r^2$, $B=\pi \times (PM/2\pi)^2$ is derived and so the sphericity of each particle can be calculated as circularity=$A/B=A\times 4\pi/(PM)^2$. This was measured for 100 or more particles that were arbitrarily selected, and their mean values were squared to obtain the average sphericity. A solution for measurement was prepared by adding 20 ml of distilled water and 10 ml of propylene glycol to 0.1 g of the sample and performing ultrasonic dispersion treatment for 3 minutes.

(2) Average Particle Size

The average particle size of the alumina powder was measured by a laser diffraction scattering method (trade name "Model LS-230" available from Beckman Coulter Inc.). In the present invention, the average particle size refers to a median diameter (d50) based on volume. This apparatus measures a particle size distribution by dividing a particle size range of 0.04 to 2000 μm into 116 divisions (log (μm)=0.04 width). Details are described in "Laser diffraction and scattering particle size distribution analyzer LS series" (Beckman Coulter Inc.); Mayumi TOYOTA, "Measuring particle size distribution" (Academic Team, Particle Physics Division in Beckman Coulter Inc.). A solution for measurement was prepared by adding the sample to pure water, and performing dispersion treatment for 1 minute with a homogenizer, such that a display of a concentration adjustment window of the apparatus was from 45 to 55%.

(3) Silane Compound

The surface treatment of the spherical alumina powder with a silane compound(s) having an alkyl group(s) can provide a spherical alumina powder having an alkyl group(s) derived from the silane compound(s) on its surface. The silane compounds having an alkyl group(s) are not particularly limited as long as they can adjust a peak intensity ratio {I (CH3)/I (CH2)} to a defined range, and the peak intensity ratio as described above can be controlled, for example by using in combination alkyl-based silane compounds represented by the chemical formulae (1) and (2). The silane compound represented by the chemical formula (1) is a trifunctional silane compound having a long-chain alkyl group with 6 to 16 carbon atoms (in the formula, n is an integer of 5 to 15). The silane compound represented by the chemical formula (2) is trimethylmethoxysilane or trimethylethoxysilane.

For example, the silane compound of the chemical formula (1) can be used in an amount of 0.2 to 2% by mass based on outer percentage relative to the spherical alumina powder, and the silane coupling agent of the chemical formula (2) can be used in an amount of 0.1 to 6% by mass based on outer percentage relative to the spherical alumina powder. For the alkyl group having less than 6 carbon atoms, the effect of lowering the viscosity of the resin composition before molding is eliminated and conversely there is a risk that the viscosity may increase. Also, for the alkyl group having more than 16 carbon atoms, compatibility with a liquid resin component deteriorates and the original effect of the surface treatment reduces.

$$CH_3(CH_2)_nSiX_3 \quad \text{Chemical Formula (1)}$$

with X=a methoxy group or an ethoxy group, and n=an integer from 5 to 15;

$$(CH_3)_3SiX \quad \text{Chemical Formula (2)}$$

with X=a methoxy group or an ethoxy group.

The surface treatment method of the spherical alumina powder with the silane compound(s) includes a spraying method using a fluid nozzle, a stirring method with shearing force, a dry method such as a ball mill and a mixer, or a wet method such as an aqueous or organic solvent. In the dry method, the silane compounds are preferably used in a state where the silane compounds of the chemical formulae (1) and (2) have been hydrolyzed in water or an organic solvent, in order to facilitate the reaction with the surfaces of the spherical alumina powder. Further, it is important that the stirring and mixing method is carried out such that the spherical alumina powder is not broken down. A temperature within the system in the dry method or a drying temperature after the treatment is appropriately determined in a range where the surface treatment agent is not thermally decomposed depending on the type of the surface treatment agent, and may be preferably from 100 to 150° C. Furthermore, the total carbon content of the surface-treated spherical alumina after the drying treatment is preferably 0.05 to 0.9% by mass, and more preferably 0.1 to 0.6% by mass.

Based on measurement of an infrared absorption spectrum for the spherical alumina powder subjected to the surface treatment with the silane compound(s), a peak intensity ratio $\{I (CH3)/I (CH2)\}$ of a peak ($2960\pm5$ $cm^{-1}$) associated with asymmetric vibration of CH3 (referred to as I (CH3)) to a peak ($2925\pm5$ $cm^{-1}$) associated with asymmetric vibration of CH2 (referred to as I (CH2)) in the alkyl group(s) of the silane compound(s) in the same IR spectral data can be calculated. The peak intensity ratio correlates with an abundance ratio of CH2 and CH3 derived from the silane compound(s) on the surface of the spherical alumina powder subjected to the surface treatment. For example, in the case of decyltrimethoxysilane wherein it has 10 carbon atoms (n=9) and X is a methoxy group in the chemical formula (1), the peak intensity ratio $\{I (CH3)/I (CH2)\}$ is 0.2, whereas the peak intensity ratio $\{I (CH3)/I (CH2)\}$ of the system that added trimethylmethoxysilane wherein X is a methoxy group in the chemical formula (2) to decyltrimethoxysilane has an increased peak intensity of CH3 due to the addition of trimethoxysilane. Thus, for example, when trimethylmethoxysilane is present on the surface in an equimolar amount relative to decyltrimethoxysilane, the peak intensity ratio $\{I (CH3)/I (CH2)\}$ is increased to 0.4.

(4) IR Measurement

IR measurement was performed using a Fourier transformation infrared spectrophotometer (product name "Spectrum One" available from Perkin Elmer Inc.). A range of 2500 to 3500 $cm^{-1}$ was measured by a diffuse reflection method under measurement conditions of resolution 4 $cm^{-1}$ and cumulative number of 10. In addition, the IR spectral data was obtained by Kubelka-Munk conversion.

(5) Calculation of Peak Intensity Ratio of IR Spectrum

The peak intensity ratio of the IR spectrum was determined by defining a distance from each top of a peak ($2960\pm5$ $cm^{-1}$) associated with asymmetric vibration of CH3 and a peak ($2925\pm cm^{-1}$) associated with asymmetric vibration of CH2 to a baseline in the spectral data obtained by the IR measurement as a peak intensity, and calculating the peak intensity ratio $\{I (CH3)/I (CH2)\}$. The baseline is a line connecting points of 2700 and 3100 $cm^{-1}$ flattened at both ends of continuous peak groups.

In one embodiment of the spherical aluminum powder according to the present invention, the intensity ratio $\{I (CH3)/I (CH2)\}$ of the peak ($2960\pm5$ $cm^{-1}$) associated with asymmetric vibration of CH3 to the peak ($2925\pm5$ $cm^{-1}$) associated with asymmetric vibration of CH2 in the alkyl group(s) of the silane compound(s) in the same spectral data obtained by the infrared spectroscopic measurement is 0.2 or more and less than 2.0. When the ratio I (CH3)/I (CH2) is within this range, a resin composition having a low viscosity can be obtained if the resin is highly filled, and an increase in viscosity over time can be effectively suppressed. The ratio I (CH3)/I (CH2) is preferably 0.3 or more and 1.8 or less, and more preferably 0.4 or more and 1.5 or less, and still more preferably 0.5 or more and 1.0 or less.

(6) Total Carbon Content

The total carbon content in the spherical alumina powder subjected to the surface treatment was determined by measuring the content of carbon on a carbon/sulfur simultaneous analyzer (trade name "Type CS-444 LS" available from LECO Co., Ltd.) and quantifying it by a calibration curve method.

Thus, the total carbon content was determined by preparing a calibration curve using a carbon steel having a known carbon content as a standard substance, and then burning and oxidizing the surface-treated spherical alumina powder together with an iron powder or a tungsten powder as an auxiliary combustion agent under an oxygen atmosphere until the surface treating agent was completely decomposed and all carbon was converted to $CO_2$, and measuring an amount of $CO_2$ produced using an infrared detector.

(7) Thermal Conductivity

To vinyl group-containing polymethylsiloxane (YE 5822 A Solution available from Momentive Performance Materials Japan Inc.) were added the spherical alumina powder, a retarder, and a crosslinking agent, etc. (YE 5822 B Solution available from Momentive Performance Materials Japan Inc.) in this order and stirred repeatedly, and then degassing treatment was carried out. The resulting slurry sample was poured into a mold provided with a depression having a diameter of 28 mm and a thickness of 3 mm, degassed, and then heated and molded at 150° C. for 20 minutes, and the thermal conductivity at room temperature was measured by a temperature gradient method. Measurement was carried out using a thermal conductivity measuring device sold by Agune Corporation under a product name of "ARC-TC-1". Note that the value of the thermal conductivity when filling the spherical alumina powder in the maximum heat-moldable filling amount is a measured value. In this case, the mixing ratio of the vinyl group-containing polymethylsiloxane, the retarder, the crosslinking agent and the like is as illustrated in Table 3 described below, and a sample obtained by adding the alumina powder in the maximum heat-moldable filling amount to a liquid that has been prepared by adding 0.01 parts by mass of retarder to 100 parts by mass of a silicone rubber mixed solution that has been prepared by mixing 10 parts by volume of a silicone rubber A solution with one part by volume of a silicone rubber B solution is a thermal conductivity measuring sample. The maximum heat-moldable filling amount refers to the maximum filling amount at which voids are not generated in the sheet after heat molding.

(8) Viscosity 65 vol % (88.1 wt %) of the spherical alumina powder was added to the vinyl group-containing polymethylsiloxane (YE 5822 A Solution available from Momentive Performance Materials Japan, Inc.) and then subjected to stirring and degassing treatment to prepare a sample for measuring viscosity. Measurement was carried out at a temperature of 30° C. using a type B viscometer (trade name "TVB-10" available from Toki Sangyo Co., Ltd.).

The resin composition of the present invention is obtained by filling the spherical alumina powder of the present invention as stated above. The filling amount varies depending on application, but is preferably 60 to 80 vol %.

The resin composition of the present invention may include a resin such as a silicone-, acrylic- and urethane-based resin, a rubber, or a gelatinous substance, and may preferably include, but not limited to, a rubber or gel resulting from one or two-pack type addition reaction type liquid silicone having an organic group(s) such as a methyl group and a phenyl group. Examples of these include "YE 5822 A/B" available from Momentive Performance Materials Japan Inc., and "SE 1885 A/B" available from Dow Corning Toray Co., Ltd., and the like.

The resin composition of the present invention may contain additives such as curing agents, curing accelerators, reaction retarders, flame retardant auxiliaries, flame retardants, colorants, and tackifiers, in an amount to an extent that the effect of the present invention is not impaired.

The resin composition of the present invention can be produced by stirring, mixing, and dispersing predetermined amounts of respective materials as stated above. As an apparatus for mixing, agitating, dispersing these mixtures, a mortar machine equipped with a stirring and heating device, a triple roll, a ball mill, a planetary mixer or the like can be used. Further, these apparatuses may be used in combination with each other as appropriate. When these mixtures are cured by heating, for example, an apparatus of a shelf dry type is used under drying conditions such as, for example, a temperature range of 70 to 120° C. for 1 to 10 hours.

EXAMPLES

Hereinafter, the present invention will be described in detail with reference to Examples and Comparative Examples.

Example 1

30% by mass of a silane compound reagent B: decyltrimethoxysilane (a reagent available from Tokyo Chemical Industry Co., Ltd.) as shown in Table 2 as a silane compound represented by the chemical formula (1); 25% by mass of methanol; 30% by mass of a silane compound reagent E: trimethylmethoxysilane (a reagent available from Tokyo Chemical Industry Co., Ltd.) as a silane compound represented by the chemical formula (2); and 15% by mass of water for hydrolysis were mixed in this order, and stirred at room temperature for 1 day to prepare a hydrolyzed solution. 1.0 part by mass of the hydrolyzed solution was then added to 100 parts by mass of spherical alumina powder obtained by mixing spherical alumina coarse powder A2 (an average particle size: 50 average sphericity: 0.92) with spherical alumina fine powder A4 (an average particle size: 5 μm, average sphericity: 0.91) as indicated in Table 1 at a mass ratio of 60:40, and then mixed and stirred with a mixer (product name "EL-1" available from Nippon Eirich Co., Ltd.) for 5 minutes, placed at room temperature for 1 day, and then subjected to heat treatment at 130° C. for 1 hour to prepare a spherical alumina powder sample of Example 1. Thus, added amounts of the silane compound, methanol and water in the spherical alumina powder after the surface treatment, as indicated in outer percentage by mass relative to the mass of the spherical alumina powder, are such that the silane compound reagent B is 0.3% by mass, methanol is 0.25% by mass, and water is 0.15% by mass.

The total carbon amount and the IR peak intensity ratio of the spherical alumina powder of Example 1, and the viscosity and thermal conductivity of the resin composition were determined by the methods as described above. There are no substantial change in the average particle size and the average sphericity of the alumina powder before and after the surface treatment.

Examples 2, 3 and 4

In Example 2, an added amount of the silane compound reagent E: trimethylmethoxysilane was increased (0.50% by mass in terms of outer percentage relative to the spherical alumina powder) and methanol was 0.05% by mass in terms of outer percentage. In Example 3, a reagent A: hexyltrimethoxysilane (a reagent available from Tokyo Chemical Industry Co., Ltd.) was used in place of the silane compound reagent B: decyltrimethoxysilane. In Example 4, a reagent C: hexadecyltrimethoxysilane (a reagent available from Tokyo Chemical Industry Co., Ltd.) was used in place of the silane compound reagent B: decyltrimethoxysilane. Otherwise, spherical alumina powder was prepared, and the spherical alumina powder was subjected to the surface treatment, and resin compositions were prepared and evaluated, in the same manner as in Example 1.

Examples 5, 6, 7 and 8

In Example 5, spherical alumina fine powder A3 (an average particle size: 10 μm, average sphericity: 0.90) was used in place of the spherical alumina fine powder A4, and the mixing ratio of coarse powder to fine powder was A2:A3=55:45 in a mass ratio. In Example 6, ultrafine powder A5 (an average particle size: 0.3 μm, average sphericity: 0.92) was added in an amount of 10% by mass in terms of inner percentage relative to Example 1. In Example 7, ultrafine powder A6 (an average particle size: 0.6 μm, average sphericity: 0.85) was added in an amount of 10% by mass in terms of inner percentage relative to Example 1. In Example 8, coarse powder A1 (an average particle size: 70 μm, average sphericity: 0.95) and ultrafine powder A5 (an average particle size: 0.3 μm, average sphericity: 0.92) were mixed in a mass ratio of A1:A5=90:10 to prepare spherical alumina powder. Otherwise, spherical alumina powder was prepared, and the spherical alumina powder was subjected to the surface treatment, and resin compositions were prepared and evaluated, in the same manner as in Example 1.

Examples 9 and 10

In Example 9, alumina powder coarse powder A7 (an average particle size: 50 μm, average sphericity: 0.75) having average sphericity of less than 0.85 and alumina fine powder A8 (an average particle size: 10 μm, average sphericity: 0.70) were used in place of the spherical alumina coarse powder A2 and the fine powder A4 of Example 2, respectively. In Example 10, ultrafine powder A9 (an average particle size: 0.06 μm, average sphericity: 0.90) having an average particle size of less than 0.1 μm was added in an amount of 10% by mass in terms of inner percentage relative to Example 2. Otherwise, spherical alumina powder was prepared, and the spherical alumina powder was subjected to the surface treatment, and resin compositions were prepared and evaluated, in the same manner as in Example 1.

Comparative Examples 1, 2 and 3

Comparative Example 1 corresponds to a case where the spherical alumina powder of Example 1 is not subjected to the surface treatment with the silane compound. Comparative Example 2 is similar to Example 1, with the exception that the silane compound reagent E is not used. In Comparative Example 3, spherical alumina powder was prepared, and the spherical alumina powder was subjected to the surface treatment, and resin compositions were prepared and evaluated, in the same manner as in Example 1, with the exception that a reagent D (n=2): propyltrimethoxysilane (a reagent available from Tokyo Chemical Industry Co., Ltd.) having n of less than 5 in the chemical formula 2 was used in place of the silane compound reagent B of Example 1: decyltrimethoxysilane.

TABLE 1

| Alumina Powders | Spheroidicity | Average Diameter (μm) |
|---|---|---|
| A1 | 0.95 | 70 |
| A2 | 0.92 | 50 |
| A3 | 0.90 | 10 |
| A4 | 0.91 | 5 |
| A5 | 0.92 | 0.3 |
| A6 | 0.85 | 0.6 |
| A7 | 0.75 | 50 |
| A8 | 0.70 | 10 |
| A9 | 0.90 | 0.06 |

TABLE 2

| | Types of Silane Compounds | n |
|---|---|---|
| Reagent A | Hexyltrimethoxysilane | 5 |
| Reagent B | Decyltrimethoxysilane | 9 |
| Reagent C | Hexadecyltrimethoxysilane | 15 |
| Reagent D | Propyltrimethoxysilane | 2 |
| Reagent E | Trimethylmethoxysilane | — |

TABLE 3

| Types of Materials | | Mixing Ratio at 65% by Volume (% by volume) | Mixing Ratio at 75% by Volume (% by volume) |
|---|---|---|---|
| Silicone Rubber A Solution | "YE 5822 A" Product from Momentive Performance Materials Japan Inc. | 31.8 | 22.7 |
| Silicone Rubber B Solution | "YE 5822B" Product from Momentive Performance Materials Japan Inc. | 3.2 | 2.3 |
| Alumina Powder | Indicated in Table 1 | 65.0 | 75.0 |
| Retardant | Dimethyl Maleate (From Kanto Chemical Co., Inc.) | (Mass of Silicone Rubber A Solution + Mass of Solution B) × 0.01% by mass | |

* Silicone Rubber A Solution:Silicone Rubber B Solution = 10:1 (% by volume)

TABLE 4

| | Alumina Powders | | | | | | | | Compositions | | | | |
|---|---|---|---|---|---|---|---|---|---|---|---|---|---|
| | Components | | | Composition Ratio (% by mass) | | | Average Particle Diameter of Mixed Powders (μm) | Total Carbon Content (% by mass) | IR Peak Intensity Ratio I(CH3)/I(CH2) | Silane Compounds | Slurry Viscosity (Pa·s) *1 | | Maximum Filling Amount *2 % by volume | Thermal Conductivity *3 (WmK) |
| | Coarse Powder | Fine powder | Ultrafine Powder | | | | | | | | 1 Day After Treatment | 2 Weeks After Treatment | | |
| Example 1 | A2 | A4 | — | 60 | 40 | — | 29 | 0.5 | 0.4 | B E | 55 | 58 | 77.5 | 5.1 |
| Example 2 | A2 | A4 | — | 60 | 40 | — | 29 | 0.4 | 0.6 | B E | 40 | 45 | 80.0 | 5.5 |
| Example 3 | A2 | A4 | — | 60 | 40 | — | 29 | 0.4 | 1.8 | A E | 62 | 64 | 75.0 | 4.8 |
| Example 4 | A2 | A4 | — | 60 | 40 | — | 29 | 0.6 | 0.3 | C E | 60 | 64 | 75.0 | 4.8 |
| Example 5 | A2 | A3 | — | 55 | 45 | — | 33 | 0.08 | 0.4 | B E | 59 | 64 | 75.0 | 4.9 |
| Example 6 | A2 | A4 | A5 | 54 | 36 | 10 | 24 | 0.9 | 0.4 | B E | 70 | 70 | 72.5 | 5.5 |
| Example 7 | A2 | A4 | A6 | 54 | 36 | 10 | 28 | 0.8 | 0.4 | B E | 65 | 67 | 77.5 | 5.3 |
| Example 8 | A1 | — | A5 | 90 | — | 10 | 65 | 0.8 | 0.4 | B E | 60 | 63 | 75.0 | 4.8 |
| Example 9 | A7 | A8 | — | 60 | 40 | — | 35 | 0.4 | 0.6 | B E | 75 | 80 | 65.0 | 4.6 |
| Example 10 | A2 | A4 | A9 | 54 | 36 | 10 | 23 | 0.9 | 0.6 | B E | 75 | 78 | 65.0 | 4.3 |
| Comparative Example 1 | A2 | A4 | — | 60 | 40 | — | 29 | 0.0 | — | — — | 76 | 76 | 70.0 | 3.8 |
| Comparative Example 2 | A2 | A4 | — | 60 | 40 | — | 29 | 0.4 | 0.14 | B — | 55 | 80 | 70.0 | 3.8 |
| Comparative Example 3 | A2 | A4 | — | 60 | 40 | — | 29 | 0.1 | 2.3 | D E | 138 | 145 | 67.5 | 3.4 |

*1 Alumina after one day after the surface treatment and after two weeks in an atmosphere at 85° C. and 80% Rh was used, and the slurry viscosity was a value for an alumina filling amount of 65 vol %.
*2 Maximum filling amount of alumina that allows molding
*3 The thermal conductivity is a value at the maximum filling amount of alumina Among the viscosity of the slurries in Table 4, the viscosity after one day of treatment is viscosity measured on one day after the above-mentioned heat treatment of the spherical alumina powder, and the viscosity after two weeks of treatment is viscosity measured after storing the heat-treated alumina powder as stated above under an atmosphere of 85° C. and 80% Rh for two weeks. In Example 1 that also uses the silane compound reagent E, a difference between the viscosity after one day of treatment and the viscosity after two weeks of treatment was smaller, whereas in Comparative Example 2 that does not use reagent E, a difference between the viscosity after one day of treatment and the viscosity after two weeks of treatment is larger, significantly increasing the viscosity after 2 weeks of treatment. It demonstrates that optimizing the IR peak intensity ratio {I (CH3)/I (CH2)} by also using the silane compound reagent E is remarkably effective against an increase in viscosity of the resin composition over time after the surface treatment of the spherical alumina powder.

As can be seen from Examples and Comparative Examples in Table 4, the spherical alumina powder of the present invention, when incorporated into the resin in the higher amount, can reduce the viscosity of the resin composition before molding. Further, even if the spherical alumina powder is used after a number of days from the surface treatment have passed, the initial low viscosity effect of the resin composition can be maintained. Furthermore, the resin composition after molding exhibits higher thermal conductivity.

INDUSTRIAL APPLICABILITY

The spherical alumina powder of the present invention is suitably used as a filler for a thermal conductive resin composition. The resin composition of the present invention is also used as a heat dissipating member for thermal countermeasures of personal computers, automobiles, portable electronic devices, household electrical appliances, and the like.

The invention claimed is:

1. A surface-treated spherical alumina powder surface treated by at least one silane compound, the surface-treated spherical alumina powder comprising at least one alkyl group derived from the at least one silane compound on a surface of the spherical alumina powder, wherein a peak intensity ratio {I (CH$_3$)/I (CH$_2$)} of a peak (2960±5 cm$^{-1}$) associated with asymmetric vibration of CH$_3$ to a peak (2925±5 cm$^{-1}$) associated with asymmetric vibration of CH$_2$ in the at least one alkyl group in the same spectral data obtained by infrared spectroscopic analysis measurement is 0.2 or more and less than 2.0, wherein a total carbon content in the spherical alumina powder is from 0.05 to 0.9% by mass, and wherein the surface-treated spherical alumina powder has been treated by at least one silane compound of chemical formula (1) and at least one silane compound of chemical formula (2), and the at least one alkyl group is a plurality of alkyl groups comprising at least one alkyl group derived from chemical formula (1) and at least one alkyl group derived from chemical formula (2):

$$CH_3(CH_2)_nSiX_3 \qquad \text{Chemical Formula (1)}$$

with X=a methoxy group or an ethoxy group, and n=an integer from 5 to 15; and $$(CH_3)_3SiX \qquad \text{Chemical Formula (2)}$$

with X=a methoxy group or an ethoxy group.

2. The surface-treated spherical alumina powder according to claim 1, wherein an average particle size is 0.1 to 100 μm and average sphericity is 0.85 or more.

3. The surface-treated spherical alumina powder according to claim 1, wherein the total carbon content is from 0.1 to 0.6% by mass.

4. A resin composition comprising the surface-treated spherical alumina powder according to claim 1.

5. A method for producing the surface-treated spherical alumina powder according to claim 1, comprising a plurality of alkyl groups, said method comprising performing a surface treatment of a spherical alumina powder with both of the following silane compounds of the chemical formulae (1) and (2):

$$CH_3(CH_2)_nSiX_3 \qquad \text{Chemical Formula (1)}$$

with X=a methoxy group or an ethoxy group, and n=an integer from 5 to 15; and $$(CH_3)_3SiX \qquad \text{Chemical Formula (2)}$$

with X=a methoxy group or an ethoxy group, to adjust the peak intensity ratio {I (CH$_3$)/I (CH$_2$)} of the peak (2960±5 cm$^{-1}$) associated with asymmetric vibration of CH$_3$ to the peak (2925±5 cm$^{-1}$) associated with asymmetric vibration of CH$_2$ in the plurality of alkyl groups in the same spectral data obtained by infrared spectroscopic analysis measurement to 0.2 or more and less than 2.0.

6. The method for producing a surface-treated spherical alumina powder having a plurality of alkyl groups according to claim 5, wherein the silane compound of the chemical formula (1) is used in an amount of 0.2 to 2% by mass based on an outer percentage relative to the spherical alumina powder, and the silane compound of the chemical formula (2) is used in an amount of 0.1 to 6% by mass based on the outer percentage relative to the spherical alumina powder.

7. The method for producing a surface-treated spherical alumina powder having a plurality of alkyl groups according to claim 5, further comprising performing a drying treatment of the surface-treated spherical alumina such that a total carbon content of the surface-treated spherical alumina after the drying treatment is 0.05 to 0.9% by mass.

8. The method for producing a surface-treated spherical alumina powder having a plurality of alkyl groups according to claim 5, wherein the surface treatment of the spherical alumina powder is performed to adjust the peak intensity ratio {I (CH$_3$)/I (CH$_2$)} to 0.5 or more and 1.0 or less.

9. The method for producing surface-treated spherical alumina powder having a plurality of alkyl groups according to claim 5, wherein an average particle size of the spherical alumina powder is 0.1 to 100 μm and an average sphericity is 0.85 or more.

10. The method for producing a surface-treated spherical alumina powder having a plurality of alkyl groups according to claim 5, further comprising performing a drying treatment of the surface-treated spherical alumina such that a total carbon content of the surface-treated spherical alumina after the drying treatment is 0.1 to 0.6% by mass.

* * * * *